United States Patent [19]

Laipply

[11] Patent Number: 4,923,228

[45] Date of Patent: May 8, 1990

[54] INTEGRAL QUICK-CONNECT TUBE CONNECTOR

[75] Inventor: Robert A. Laipply, Jackson, Mich.

[73] Assignee: Aeroquip Corporation, Jackson, Mich.

[21] Appl. No.: 282,699

[22] Filed: Dec. 12, 1988

[51] Int. Cl.⁵ .............................................. F16L 37/04
[52] U.S. Cl. ................................... 285/319; 285/320; 285/351; 285/39; 285/423; 285/921
[58] Field of Search ............... 285/319, 320, 305, 921, 285/423, 351, 39

[56] References Cited

U.S. PATENT DOCUMENTS

| | | |
|---|---|---|
| 921,691 | 5/1909 | Friday . |
| 3,686,896 | 8/1972 | Rutter ................................. 285/320 |
| 3,933,378 | 1/1976 | Sandford et al. . |
| 4,441,745 | 4/1984 | Nicholas .............................. 285/921 |
| 4,637,640 | 1/1987 | Fournier et al. . |
| 4,647,082 | 3/1987 | Fournier et al. . |
| 4,743,051 | 5/1988 | Proni ................................... 285/319 |
| 4,775,172 | 10/1988 | Sauer .................................. 285/319 |
| 4,793,637 | 12/1988 | Laipply et al. ................. 285/319 X |
| 4,793,639 | 12/1988 | Glover et al. ...................... 285/319 |
| 4,834,423 | 5/1989 | Deland ................................. 285/39 |

*Primary Examiner*—Randolph A. Reese
*Assistant Examiner*—Carol I. Bordas
*Attorney, Agent, or Firm*—Beaman & Beaman

[57] ABSTRACT

A quick-connect tube connector consisting of male and female parts wherein a retention system defined on the female part comprises a plurality of homogeneously formed resilient fingers which engage a shoulder defined on male part to maintain connection of the parts upon the male part being fully inserted into the female part. Both pasts are molded of a synthetic plastic material and a release sleeve may be axially displaceably mounted on the male part moveable to a release position engaging the fingers and deflecting the fingers from engagement with the shoulder permitting separation of the parts.

9 Claims, 1 Drawing Sheet

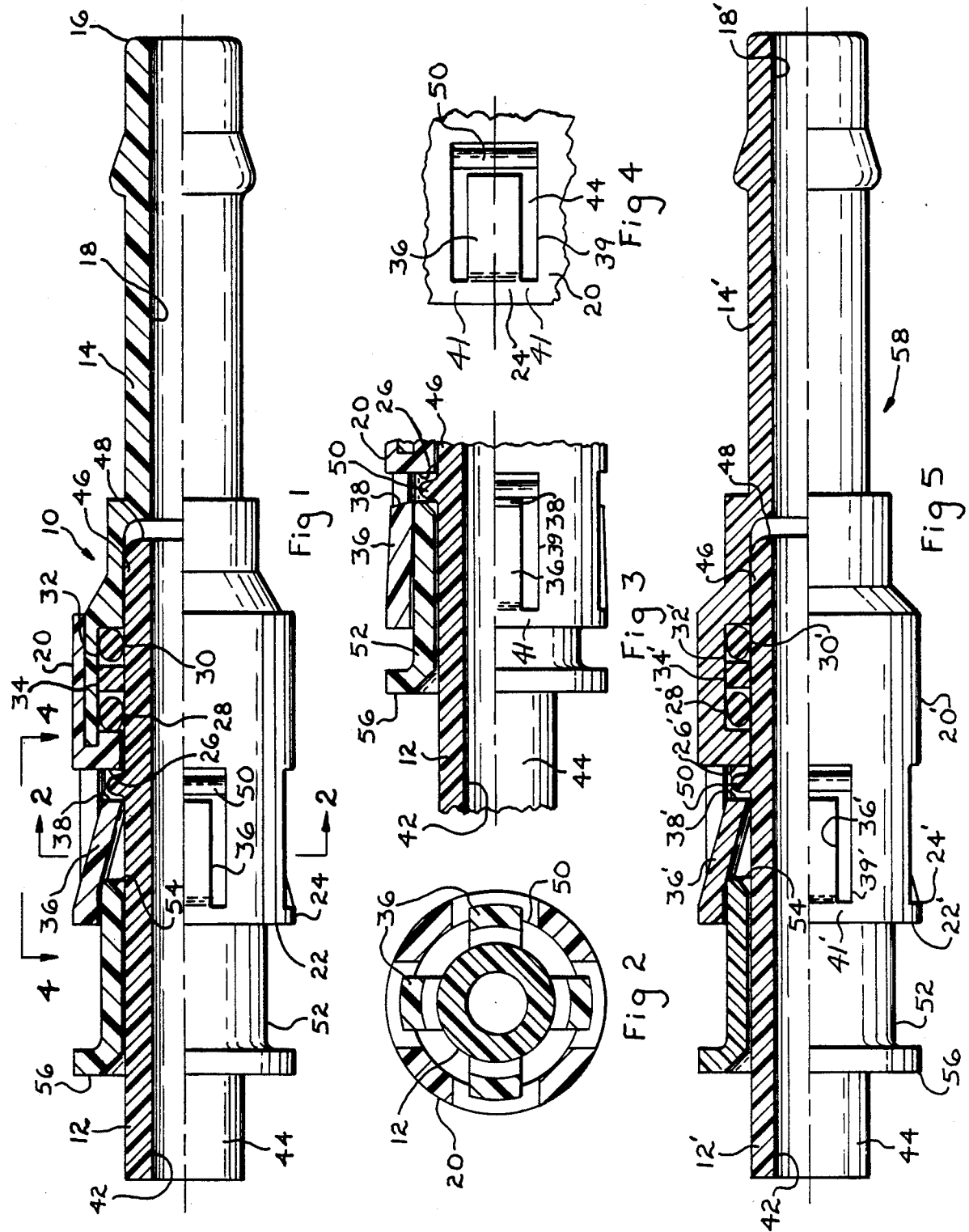

INTEGRAL QUICK-CONNECT TUBE CONNECTOR

BACKGROUND OF THE INVENTION

Quick-connect tube connectors or fluid couplings are used in assembly operations to interconnect fuel lines, install automotive air conditioner units, or the like where it is desirable to accomplish assembly of tubing lines to compressors and other components as quickly as possible. Such connectors consist of a male and female part wherein the parts may be quickly connected merely by inserting one coupling part into the other. A retention system usually includes a retainer which has resilient fingers and is mounted on one body part and the fingers enqaqe with a shoulder on the other part upon the parts beinq fully connected to maintain connection of the parts. Typical examples of these types of connectors are shown in U.S. Pat. No. 3,933,378 and the assignee's U.S. Pat. Nos. 4,637,640 and 4,647,082. Some connectors include release means for releasing the fingers from engagement with the shoulder permitting separation of the parts as in U.S. Pat. No. 4,647,082.

The aforedescribed types of tube connectors are relatively simple and quick to connect and because of the large market for these types of connectors manufacturing cost, overall size, simplicity of design and performance are important. Previously, a coupling has not incorporated all of these aforementioned features into one single construction.

It is an object of the invention to provide a quick-connect tube connector wherein the connector parts are interconnected by resilient fingers and wherein the resilient fingers are homogeneously formed with one of the parts.

Another object of the invention is to provide a quick-connect tube connector wherein the tube connector is of low manufacturing cost and durable under high stress loading conditions.

An additional object of the invention is to provide a quick-connect tube connector wherein the connector parts have a integrally formed retention system permitting the smallest overall size tube connector possible for a given capacity.

A further object of the invention is to provide a quick-connect tube connector that can be easily and quickly connected and wherein an integral retention system maintains connection of the parts.

Yet a further object of the invention is to provide a quick-connect tube connector wherein a finger release sleeve may be mounted upon the connector axially movable between finger locking and finger release positions.

In the practice of the invention the tubular male part has a nose at one end and an external annular shoulder axially spaced from the nose. The female part has an axial passage, an integral extension having an open end for receiving the male nose, an annular shoulder stop located within the axial passage and resilient fingers homogeneously formed adjacent the open end extending longitudinally toward the stop having free ends that are radially extending inwardly.

The parts are interconnected by axially forcing the male nose into the female open end wherein the shoulder engages the resilient fingers deflecting the fingers outwardly as the shoulder passes underneath the fingers and once the shoulder passes the fingers' free ends the resilient fingers drop over the shoulder preventing withdrawal of the male tube.

If it is desired to disconnect the parts a sleeve mounted on the male part is axially receivable within the female open end by axially forcing the sleeve towards the female part wherein the sleeve will engage and displace the fingers radially outwardly from engagement with the shoulder permitting removal of the male part. The release sleeve may be omitted to prevent tampering.

The resilient fingers are both torsion and cantilever supported adjacent the female open end and are radially spaced so that the imparted stresses to fingers are evenly dispersed allowing for high loading conditions. The homogeneously formed fingers eliminate the need for mounting a separate retention system in the connector permitting low cost manufacturing and providing a connector of the smallest overall size possible for a given capacity.

BRIEF DESCRIPTION OF THE DRAWINGS

The aforementioned objects and advantages of the invention will be appreciated from the accompanying drawings wherein:

FIG. 1 is an elevational view, partially in section, of a quick-connect tube connector in accord with the invention, FIG. 2 is an elevational, sectional view, taken along Section II—II of FIG. 1, FIG. 3 is a detail, elevational, sectional view of the embodiment of FIGS. 1–2, illustrating the release sleeve in the finger release position, FIG. 4 is a detail, plan view of a finger as taken along Section III—III of FIG. 2, and FIG. 5 is an elevational, sectional view of another embodiment of a quick-connect tube connector in accord with the invention.

DESCRIPTION OF THE PREFERRED EMBODIMENT

One embodiment of the connector of the invention is shown in FIGS. 1–4. In this embodiment the connector 10 consists of a cylindrical tubular male part 12 and a generally tubular female part 14. Each part has a simplified molded configuration formed of a synthetic plastic material. The body 14 includes a conduit connection end 16 which may be attached to a hose, not shown, or the like, for establishing fluid communication between the female part and a fluid circuit, not shown. An axial passage 18 extends through the body 14.

At the other end of the body 14 an extension 20 is attached by heat spinning or other bonding and has an open end 22 for receiving the male part 12. A web 24 is defined on the extension 20 adjacent the open end 22. A shoulder stop 26 is defined within the passage 18 for limiting insertion of the male part 12 into the female passage 18. Sealing 0 rings 28 and 30, located in an annular recess 32 adjacent the stop 26, are separated by a spacer 34 and provide a fluid tight seal with the outer surface of the male part.

A plurality of cantilevered fingers 36 are supported at the web 24 and are radially and circumferentially spaced to evenly divide the stresses imparted to the fingers 36. The fingers 36 are homogeneously formed of the material of extension 20 and extend radially inwardly and extend longitudinally within the female passage 18 towards the stop 26. The fingers 36 have arcuate free ends 38 that are substantially concentric to the female passage 18.

The fingers 36 are located within openings 39 defined in the extension 20 which are of a width greater than the width of the fingers 36 defining torsion regions 41 of reduced dimension in the web 24. The torsion regions 41 each have an axis of twisting or rotation which is substantially perpendicular to the length of the associated finger. Thus when the finger's ends 38 are deformed outwardly, in addition to beam deflection within the finger itself, the regions 41 will slightly twist in a resilient manner also biasing the associated finger inwardly. This cantilever beam torsion mounting of the fingers 36 permits the extension 20 to be formed of a stronger and stiffer material than if both types of deflection stresses were not present.

The male part 12 has an axial passage 42, an outer cylindrical surface 44 and an elongated cylindrical nose 46 having an end 48. An external annular shoulder 50 is defined on the male part 12 axially spaced from the nose end 48. A finger release sleeve 52 is axially displaceably mounted on the male outer surface 44. The sleeve 52 includes a conical counterbore 54 at its inner end and a lip 56 at its outer end for a finger push surface.

Interconnection of the bodies 12 and 14 is achieved by axially aligning the bodies and inserting the nose 46 of the male body 12 into the open end 22 of the female part 14. As the body 12 is inserted into the passage 18 the male shoulder 50 will engage the fingers 36 deflecting the fingers outwardly as they ride over the shoulder 50. Once the shoulder 50 passes the fingers' free ends 38 the fingers will "snap" inwardly due to the beam deflection of the fingers and the torsion forces created in the regions 41 and the fingers move toward the surface 44 in axial alignment with the shoulder 50 preventing withdrawal of the body 12 from the body 14. Upon connection, the sealing O rings 28 and 30 will engage the outer surface 44 of the male body 12 to provide a fluid tight seal preventing leakage in the connector 10.

To disconnect the bodies 12 and 14 it is merely necessary to axially force the finger release sleeve 52 into the female open end 22 wherein the sleeve will engage the fingers 36 displacing the fingers' free ends 38 radially outwardly out of axial alignment with the shoulder 50 as shown in FIG. 3. Thereupon, the male body 12 may be axially pulled away from the female body 14 to easily disconnect the parts.

In FIG. 5, another embodiment of the invention is disclosed utilizing the same inventive concepts as illustrated in FIGS. 1-4. The same male body as disclosed in FIGS. 1-4 is shown in FIG. 5. The female body shown in FIG. 5 is the same configuration as the female body 14 disclosed in FIGS. 1-4 however the female body in FIG. 5 has been modified to combine the extension and body into one-piece wherein the fingers are homogeneously formed with the extension. In FIG. 5 female components functionally equivalent to those previously described are identified by primed reference numerals.

In FIG. 5 the connector 58 includes the male body 12 and a female body 14'. The body 14' is a made from a synthetic plastic material molded into a one-piece body including an axial passage 18', an annular recess 32' wherein sealing O rings 28' and 30' are located separated by a spacer 34', a shoulder stop 26' for limiting insertion of the male part 12 into the female body 14', a homogenous extension 20' having an open end 22', a web 24' defined adjacent the open end 22', and homogeneously extending resilient fingers 36' are supported at the web 24'. The fingers 36' radially extend inwardly and extend longitudinally towards the stop 26'. The fingers 36' have free ends 38' substantially concentric to the female axial passage 18'.

As previously described, the difference between the embodiments disclosed in FIGS. 1-4 and FIG. 5 is that in the female part 14' the extension 20' is homogeneously formed rather than bonded on as in the embodiment disclosed in FIGS. 1-4 further reducing costs. The body parts 12 and 14' are connected and disconnected in the same manner as previously described in the embodiment disclosed in FIGS. 1-4.

It is appreciated that various modifications to the inventive concepts may be apparent to those skilled in the art without departing from the spirit and scope of the invention.

I claim:

1. A quick-connect tube connector characterized by its low cost construction comprising, in combination, a male tubular part having an elongated cylindrical nose and an external annular shoulder defined on said nose, a female body having an axial passage, an end for connecting to a conduit, and a cylindrical extension having an open end for axially receiving said male part nose, a stop defined in said female body passage limiting insertion of said male part nose into said female body passage, a plurality of elongated resilient fingers homogeneously defined on said extension adjacent said open end and located within the cylindrical configuration of said extension, said resilient fingers being formed of the material of said extension and each having a deflectable free end engagable with said male part shoulder for maintaining said male part nose in said female body passage upon said nose being fully axially inserted into said extension open end, torsion means defined on said extension adjacent said open end supporting said fingers with regions having a torsion axis transversely disposed to the length of said fingers, a recess defined in said female passage and sealing means within said recess receiving said nose.

2. In a quick-connect tube connector as in claim 1, wherein said male tubular part is made from a synthetic plastic material.

3. In a quick-connect tube connector as in claim 1, wherein said female body is made from a synthetic plastic material.

4. In a quick-connect tube connector as in claim 1, said female body comprising a primary tube upon which said connecting end is defined, said extension comprising an annular sleeve integrally affixed to said tube.

5. In a quick-connect tube connector as in claim 1, said female body comprising a primary tube upon which said connecting end is defined, said extension being homogeneously defined on said tube.

6. A quick-connect tube connector characterized by its low cost construction comprising, in combination, a male tubular part having an outer surface, an elongated cylindrical nose and an external annular shoulder defined on said nose, a female body having an axial passage, an end for connecting to a conduit, a homogeneous cylindrical extension having an open end for receiving said male part nose, a stop defined in said female passage engagable with said male part limiting insertion of said male part nose into said female body passage, a recess defined in said female body passage having sealing means disposed within for providing a fluid tight seal with said male part nose, a plurality of elongated cantilevered resilient fingers homogeneously extending from said extension and located within the cylindrical configuration of said extension, said resilient fingers each having an inwardly extending deflectable free end engagable with said male part shoulder for maintaining said male part nose in said female body passage upon said male part nose being fully axially inserted into said female body open end and, torsion means defined on said extension adjacent said open said supporting said fingers with regions having a torsion axis transversely disposed to the length of said fingers.

7. In a quick-connect tube connector as in claim 6, said female body being formed of a synthetic plastic material molded into a one-piece configuration wherein said female body, extension and fingers are homogeneous.

8. In a quick-connect tube connector as in claim 7, said resilient fingers each having parallel side edges and an end substantially perpendicular to said associated side edges, said ends being substantially concentric to said female body passage.

9. A quick-connect tube connector characterized by its low cost construction comprising, in combination, a male tubular part having an elongated cylindrical nose and an external annular shoulder defined on said nose, a female body having an axial passage, an end for connecting to a conduit, an open end for receiving said male part nose, a stop defined in said female body passage limiting insertion of said male part nose into said female body passage, a recess defined in said female body passage having sealing means disposed within for providing a fluid tight seal with said male part nose, an annular cylindrical extension affixed to said body at said open end, a plurality of cantilevered resilient fingers homogenously defined on said extension adjacent said open end and located within the cylindrical configuration of said extension, said resilient fingers each having a deflectable free end engagable with said male part shoulder for maintaining said male part nose in said female body passage upon said nose being fully axially inserted into said female body open end through said extension and, torsion means defined on said extension adjacent said open end supporting said fingers with regions having a torsion axis transversely disposed to the length of said fingers.

* * * * *